W. TRAVIS.
SUPPLY OF ELECTRICAL ENERGY TO FURNACES OR OTHER APPLIANCES.
APPLICATION FILED FEB. 13, 1919.
1,301,887.
Patented Apr. 29, 1919.
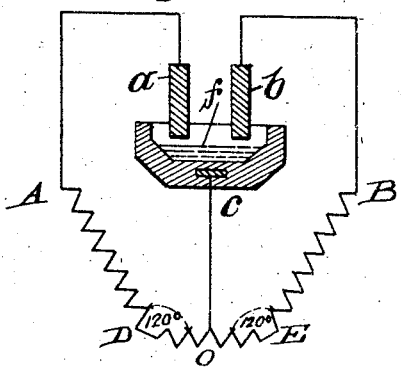
Fig. 1.
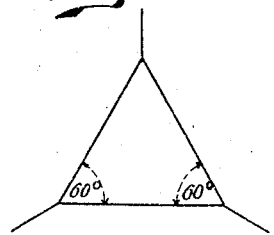
Fig. 1ª.
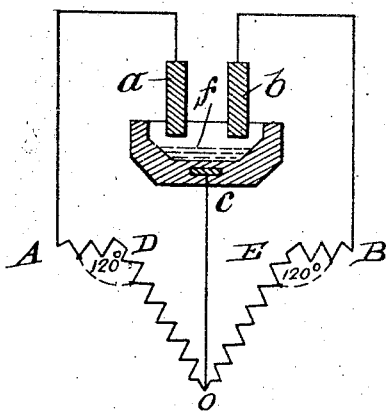
Fig. 2.
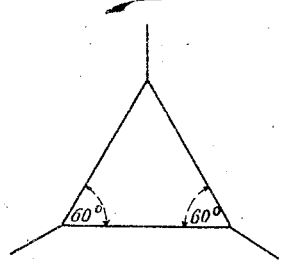
Fig. 2ª.
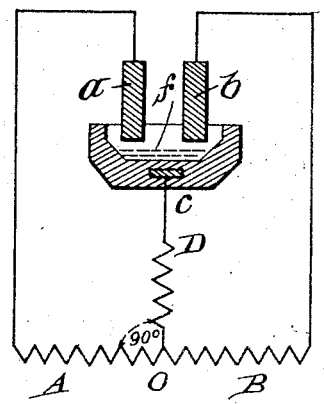
Fig. 3.
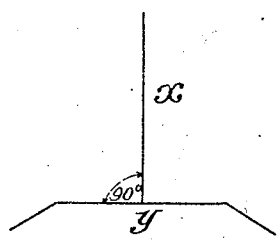
Fig. 3ª.
INVENTOR
William Travis
BY
his ATTORNEY.

UNITED STATES PATENT OFFICE.

WILLIAM TRAVIS, OF SHEFFIELD, ENGLAND.

SUPPLY OF ELECTRICAL ENERGY TO FURNACES OR OTHER APPLIANCES.

1,301,887.   Specification of Letters Patent.   Patented Apr. 29, 1919.

Application filed February 13, 1919.   Serial No. 276,754.

*To all whom it may concern:*

Be it known that I, WILLIAM TRAVIS, a subject of the King of Great Britain, and residing in Sheffield, in the county of York, England, have invented certain new and useful Improvements in Supply of Electrical Energy to Furnaces or other Appliances, of which the following is a true and exact description, reference being had to the accompanying drawings, which form a part thereof.

My invention relates to a method of distributing three phase currents to electric arc furnaces, resistance furnaces and other similar electrical energy consuming appliances, having unequal resistances and consists in an improved method of effecting the distribution so that the supply phases tend to have balanced loads both in power and power factor.

My invention will be better understood on reference to the accompanying sheet of drawings in which:

Figure 1 shows one arrangement of my invention as applied to an electric arc furnace or electric arc and resistance furnace.

Fig. 1ᵃ shows the corresponding connections of the primary circuit.

Fig. 2 shows an alternative method of my invention applied similarly to Fig. 1.

Fig. 2ᵃ shows the corresponding connections of the primary circuit.

Fig. 3 shows an alternative method of my invention applied similarly to Fig. 1.

Fig. 3ᵃ shows the corresponding connections of the primary circuit.

The same letters refer to similar parts throughout the several views.

A furnace as shown in Fig. 1 having two top electrodes $a$, $b$, and a conducting hearth or bottom electrode $c$, is connected with the low tension terminals of three single phase transformer windings A, D, DE, EB, which are grouped in open delta fashion so that transformer windings AD and BE are connected to the ends of transformer winding DE at D and E respectively and each make therewith a vector angle of 120°. The bottom electrode $c$, is connected to the middle point $o$, of transformer winding DE, and the electrodes $a$ and $b$, are connected to transformer windings at A and B respectively.

The primary windings of these transformers are grouped in delta or mesh connection as shown in Fig. 1ᵃ.

The two transformer windings AD, BE are identical in voltage and capacity, but the voltage of DE must be less than AD or BE. The exact voltage of the transformer windings varies according to the relative resistance of the furnace hearth $c$, to the normal resistance of the electric arc of the furnace between the electrode $a$, or $b$, and the charge in the furnace.

When the resistance of the furnace hearth is negligible the ratio of voltage of transformer windings AD or BE to DE is 1 to .732. As the resistance of the furnace hearth increases, the voltage of transformer windings AD and BE increases while the voltage DE decreases and may be continued up to a point when the resistance of the hearth is equal to that of one of the arcs in which case the voltage DE becomes *nil*.

By means of auto transformers or tappings in the transformer windings the relative voltage of transformers AD, BE, DE. can be regulated until the loads on the primary supply phases become balanced assuming that the currents through the electrodes $a$, and $b$, are equal.

In Fig. 2 transformer windings DO, OE are connected in mesh or delta while the winding AD, EB is split and AD is connected to the open end of OD making a vector angle of 120° therewith and EB is connected to the open end of OE making a vector angle of 120° therewith. The bottom electrode $c$, is connected to the point $o$, and the electrodes $a$, and $b$, are connected to the transformer windings at A and B respectively.

The primary windings of these two transformers are grouped in delta or mesh connection as shown in Fig. 2ᵃ.

The two transformer windings DO, OE, are identical in voltage and capacity, but the sum of the voltage AD and EB must be less than DO, or OE. The exact voltage of the transformer windings varies according to the relative resistance of the furnace hearth C, to the normal resistance of the electric arc of the furnace between the electrode $a$, or $b$, and the charge in the furnace $f$. When the resistance of the furnace hearth is negligible the ratio of the voltage of the transformer windings DO, or EO, to the sum of AD, and BE is 1 to 732. As the resistance of the furnace hearth increases, the voltage of the transformer windings DO and EO increase, while the sum of the voltage AD and BE decreases, and may be continued up to a point where the resistance of the hearth is equal to that of one of the arcs, in which case the voltage of AD and BE becomes nil.

By means of auto transformers or tappings in the transformer windings the relative voltages of the transformers DO, EO and AD, and BE, can be regulated until the loads on the primary supply phases become balanced assuming the currents through the electrodes a, and b, are equal.

Fig. 3ª shows a 3 phase current connected to 2 transformer primary windings according to the known "Scott" method. Fig. 3 shows similarly connected secondary windings, the two ends of transformer AB being connected to the furnace electrodes a and b, respectively, and one end of the other transformer winding is connected to the middle point o, of winding AB and the other end of the winding to the furnace hearth.

When the resistance of the furnace hearth C is negligible the voltage of transformer winding OD is half that of transformer winding AB. As the resistance of the furnace hearth increases the voltage of OD is increased and may be continued up to a point where the resistance of the hearth is equal to that of one of the arcs in which case the ratio of the voltage AB to OD becomes to 2 to 3.

It should be explained that the transformer primary winding X (Fig. 3ª) corresponds to the transformer secondary winding OD (Fig. 3) and the primary winding Y corresponds to the secondary winding AB, but this relation can be reversed if necessary, that is to say, primary winding X may correspond with secondary winding AB or primary winding Y may correspond with secondary winding OD.

From the foregoing it will be seen that my improved arrangement is substantially different from other arrangements employed to distribute three phase currents with a view to obtaining a balanced load on the primary supply phase.

It will also be seen from the foregoing that the current through either electrode cannot be varied without affecting all three phases of the primary supply system and that no short circuiting can occur between either of the top electrodes and the bottom without the ensuing rush of current having to traverse two transformer windings in series and also the resistance in the furnace hearth. This has a considerable damping or choking effect which limits the extent of the current overload and minimizes the extent of sudden overloads on the supply systems which constitute a serious disadvantage to most other types of furnaces.

It will also be seen that considerable metallurgical advantages accrue by being able to generate heat under the charge and to regulate the amount of heat without seriously disturbing the supply system.

Having now described my invention, what I claim as new and desire to secure by Letters Patent, is:

1. In connection with electric arc furnaces, resistance furnaces and other similar electrical energy consuming appliances having unequal resistances, the improved method of distributing three phase currents so that the supply phases tend to have balanced loads both in the power and power factor, consisting in the arrangement of the three transformer secondary windings grouped in open delta fashion so that the two windings connected to the two top electrodes or groups of electrodes are connected to the ends of the transformer windings connected to the furnace hearth or bottom electrode and each make a vector angle of 120° therewith, the two first named transformer windings being identical in voltage and capacity, and the last named transformer winding being less than either of the other two and varying in its relation thereto according to the relative resistance of the furnace hearth to the normal resistance of the electric arc of the furnace between the two upper electrodes and the charge in the furnace, substantially as herein described.

2. In connection with electric arc furnaces, resistance furnaces and other similar electrical energy consuming appliances having unequal resistances, as claimed in claim 1, the alternative method of distributing three phase currents, consisting in the arrangement of the three transformer secondary windings, two of which are connected in mesh or delta fashion and are connected at their meeting ends with the hearth or bottom electrode of the furnace, the other secondary winding being split, each portion being connected to the open end of one of the last named windings and making a vector angle of 120° therewith, and also connected to one of the two upper electrodes, substantially as herein described.

3. In connection with electric arc furnaces, resistance furnaces, and other similar electrical energy consuming appliances having unequal resistances, as claimed in claim 1, the further alternative method of distributing three phase currents, consisting in the arrangement of the transformer secondary windings connected according to the "Scott" method, and having the two ends of one transformer winding connected to the upper electrodes, the other transformer winding having its ends connected respectively to the middle point of the first named winding and to the hearth or lower electrode, substantially as herein described.

4. In connection with electric arc furnaces, resistance furnaces, and other similar electrical energy consuming appliances, having unequal resistances, the improved method of distributing three phase currents so that when the hearth is non-conductive, the current passing from one top electrode to the other top electrode must traverse all three transformer secondary windings, in series, substantially as herein described and illustrated in Figs. 1 and 2 on the accompanying drawings.

WILLIAM TRAVIS.